(No Model.) 2 Sheets—Sheet 1.

R. WHITEHILL.
SAW HAMMERING MACHINE.

No. 399,366. Patented Mar. 12, 1889.

Witnesses
Geo. W. Young.
N. E. Oliphant

Inventor,
Robert Whitehill

By Stout & Underwood
Attorneys (No Model.) 2 Sheets—Sheet 2.
R. WHITEHILL.
SAW HAMMERING MACHINE.
No. 399,366. Patented Mar. 12, 1889.
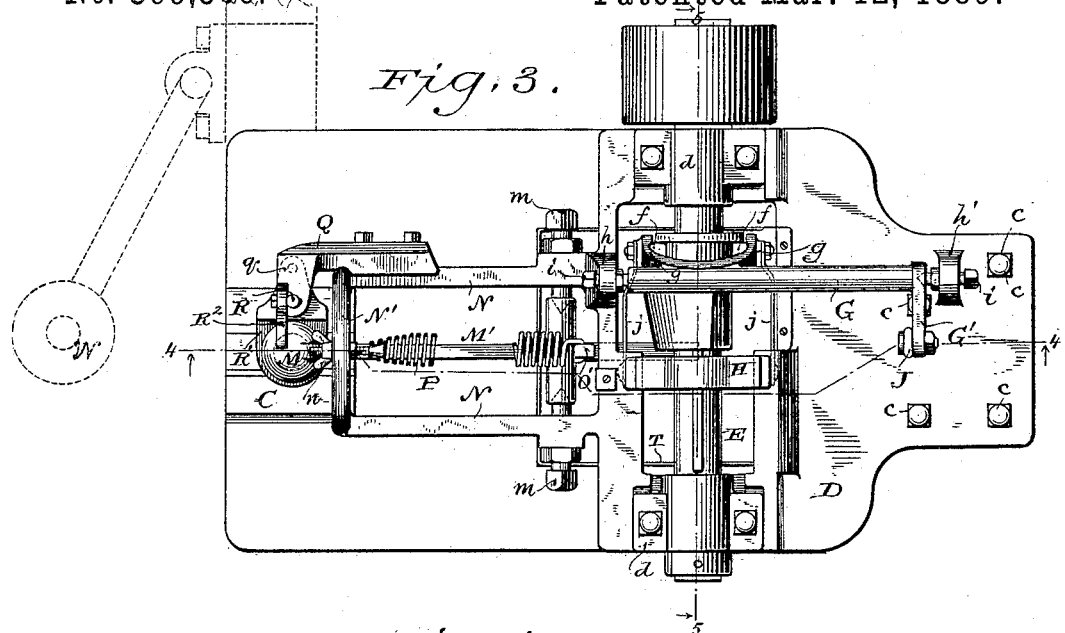
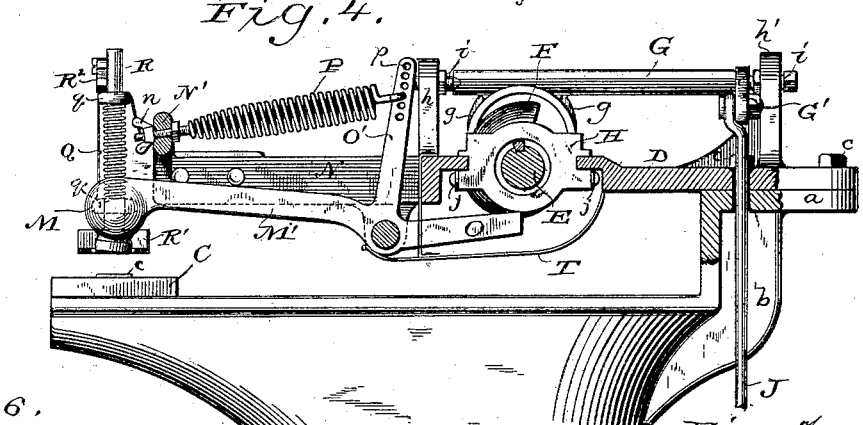
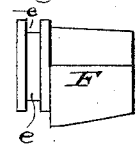
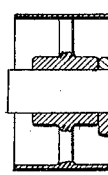
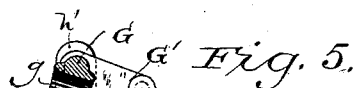
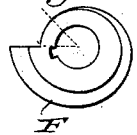
Witnesses.
Geo. W. Young.
N. E. Oliphant.
Inventor.
Robert Whitehill
By Stout & Underwood
Attorneys

UNITED STATES PATENT OFFICE.

ROBERT WHITEHILL, OF MILWAUKEE, WISCONSIN.

SAW-HAMMERING MACHINE.

SPECIFICATION forming part of Letters Patent No. 399,366, dated March 12, 1889.

Application filed March 6, 1888. Serial No. 266,310. (No model.)

*To all whom it may concern:*

Be it known that I, ROBERT WHITEHILL, of Milwaukee, in the county of Milwaukee, and in the State of Wisconsin, have invented certain new and useful Improvements in Saw-Hammering Machines; and I do hereby declare that the following is a full, clear, and exact description thereof.

My invention relates to saw-hammering machines, and will be fully described hereinafter.

Figure 1:
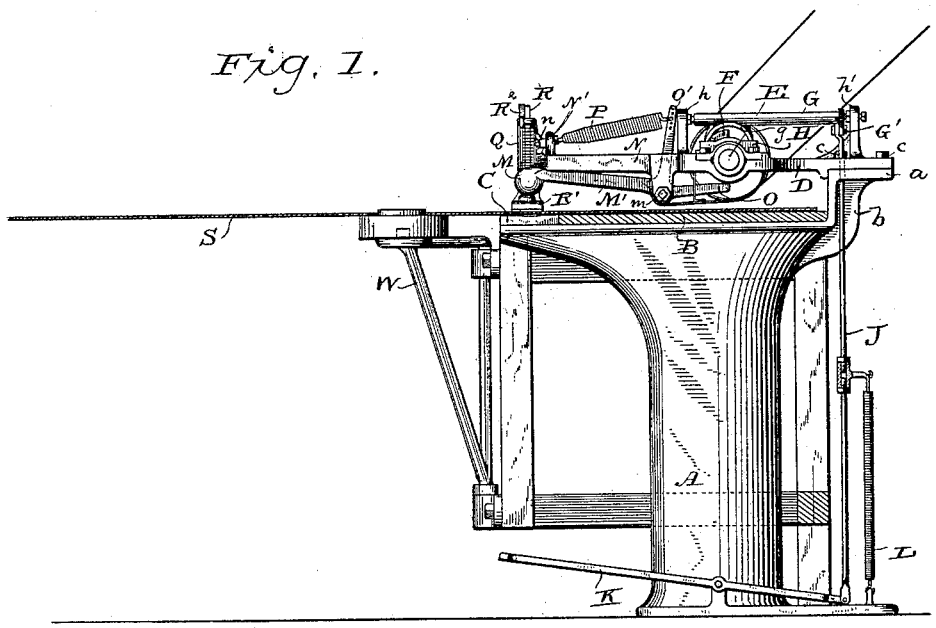
Figure 2:
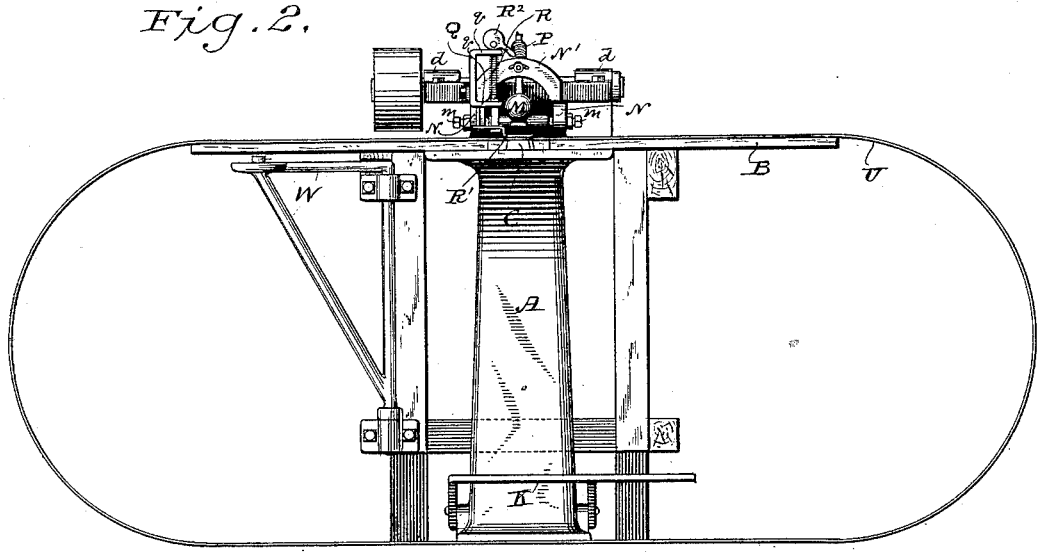

In the drawings, Figure 1 is an end elevation of my device; Fig. 2, a front elevation; Fig. 3, a plan; Fig. 4, a section on line 4 4, Fig. 3; Fig. 5, a section on line 5 5, Fig. 3; and Figs. 6 and 7, details.

A is the base or stand of my improved saw-hammering machine.

B is the table; C, the anvil.

D is a plate or frame, one edge of which rests flat upon the flange *a* of an arm, *b*, of the base A, and is secured thereto by bolts *c c c*, so as to overhang the table.

E is the shaft that carries the hammer-cam F, and which is hung in bearings *d*—one on each side of a recess in the plate or frame D. The hammer-cam F is splined onto the shaft E, and its cam portion is made tapering, as shown, while its rear end is formed with a groove, *e*, to receive the rollers *f* of the arms of a spanner, *g*, that depends from a rock-shaft, G, which latter is pivoted between two lugs, *h h'*, that project up from the frame or table D by centering-screws *i i*. A collar, H, surrounds the shaft E in front of cam F, and this collar H is toggled to the ends of spanner *g* by links *j*, so that it will be shifted in the direction of the shaft, as the cam F is shifted, by the rocking of shaft G through its arm G', treadle-rod J, and treadle K or spring L.

M is the hammer, the shank M' of which is formed with trunnions at right angles to its length, which are supported by centering-screws *m*, that pass through lugs in arms N N of the plate or frame D, and this shank M' is also formed with two arms, O O', one of which, O, projects rearward and upward into the path of hammer-cam F when in working position, while the other, O', projects upward and at an acute angle to arm O, and is perforated at *p* to receive one end of a spring, P, that connects it with an arch, N', of plate or frame D. The tension of this spring P may be regulated by a thumb-screw, *n*, or any other suitable device. A casting, Q, is bolted to one of the arms N, and its arms *q q* support the spindle R of a spring-actuated presser-foot, R', which spindle is operated by a cam, R², just as in a sewing-machine. The office of this presser-foot is to hold that part of the saw that is to be struck by each blow of the hammer upon the anvil, so that no such vibration of the saw will be produced by the blows as would be injurious or disagreeable to the attendant whose duty it is to adjust the saw as it is being worked over. This also obviates the necessity of clamping a circular saw at its center or of tightening band-saws over pulleys.

T is a shield that is interposed between the cam-hammer and table.

Operation: When a circular saw is to be hammered, it is placed upon the swinging stand W, which is formed with a hub to fit in the arbor-hole of the saw, and the saw is adjusted over the anvil by swinging the stand and turning the saw on its hub, as shown at S in Fig. 1; but when a belt-saw is to be hammered the stand is turned out of the way and the saw is placed in the position shown at U in Fig. 2. As is common in saw-hammering machines, the hammer is lifted and released by a cam, and the striking force is produced by a spring; but the main objects of my invention are to facilitate the regulation of the force of the blows of the hammer, and also the throwing of the hammer out of gear without unbelting, and this I accomplish by means of a treadle and spanner, which operate as follows: When the treadle is depressed, it rocks shaft G and causes the spanner to slide the cam F over the arm O of the hammer-shaft, and as the cam is made tapering the blows are hard or light, according to how far the cam is projected over arm O. When the hammering is to be stopped, the treadle is released, and the spring L, drawing down on rod J, causes shaft G and spanner *g* to withdraw cam F from over arm O, and to interpose collar H instead, and this collar will support the hammer at its highest point and out of the way of the saw until hammering is to begin again. Thus from no blow, when the collar H engages the arm O of the hammer, a very slight blow may be produced by a corresponding pressure on the treadle, which carries the collar H out of engagement with arm O and the thinnest portion of the cam into engagement with it, and then the force of the blows may be increased until the treadle has been depressed far enough to carry the very thickest portion of the cam over the hammer-arm.

While my device is especially designed for hammering saws, I do not propose to confine myself to its use for that purpose.

The office of spring P is to give additional force to the blows of the hammer; but when this additional force is not necessary the spring may be removed and dispensed with.

Having thus fully described my invention, what I claim as new, and desire to secure by Letters Patent, is—

1. In a hammering-machine, the combination, with the hammer-shank, of a cam for lifting the hammer, a supporting-collar connected thereto, and means for shifting the cam and supporting-collar, substantially as described.

2. In a hammering-machine, the combination, with the hammer, of a tapering cam for lifting and releasing it, a collar for supporting the hammer when at rest, and means for shifting the cam and collar simultaneously, substantially as and for the purpose set forth.

3. The combination, with the hammer, of the tapering cam, a spanner suitably connected therewith, a rock-shaft from which the spanner depends, and a treadle and spring for operating the rock-shaft, substantially as and for the purpose set forth.

4. The combination, with the hammer, of the tapering cam and connected collar, a driving-shaft to which the cam is splined, and a spanner, rock-shaft, treadle, and spring for shifting the cam and collar, substantially as described.

In testimony that I claim the foregoing I have hereunto set my hand, at Milwaukee, in the county of Milwaukee and State of Wisconsin, in the presence of two witnesses.

ROBERT WHITEHILL.

Witnesses:
S. S. STOUT,
H. G. UNDERWOOD.